US011746276B2

(12) United States Patent
Alsahlawi et al.

(10) Patent No.: US 11,746,276 B2
(45) Date of Patent: Sep. 5, 2023

(54) CONDITIONING DRILLING FLUID

(71) Applicant: Saudi Arabian Oil Company, Dhahran (SA)

(72) Inventors: Ziyad Alsahlawi, Dhahran (SA); Ossama R. Sehsah, Al Khobar (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 737 days.

(21) Appl. No.: 16/157,314

(22) Filed: Oct. 11, 2018

(65) Prior Publication Data
US 2020/0115614 A1    Apr. 16, 2020

(51) Int. Cl.
| | | |
|---|---|---|
| *E21B 21/06* | (2006.01) |
| *B01F 25/51* | (2022.01) |
| *C09K 8/36* | (2006.01) |
| *B01F 23/41* | (2022.01) |
| *B01F 35/21* | (2022.01) |
| *B01F 35/22* | (2022.01) |
| *C09K 23/00* | (2022.01) |
| *B01F 101/49* | (2022.01) |

(52) U.S. Cl.
CPC ............ *C09K 8/36* (2013.01); *B01F 23/4105* (2022.01); *B01F 25/51* (2022.01); *B01F 35/2136* (2022.01); *B01F 35/2209* (2022.01); *C09K 23/00* (2022.01); *E21B 21/062* (2013.01); *B01F 2101/49* (2022.01)

(58) Field of Classification Search
CPC ......... B01F 5/102; B01F 25/51; E21B 21/062
USPC ...................... 366/136, 137, 152.3; 137/4, 92
See application file for complete search history.

(56) References Cited

U.S. PATENT DOCUMENTS

| | | | | |
|---|---|---|---|---|
| 626,950 | A | * | 6/1899 | Wheelwright .......... B01F 5/242 366/134 |
| 981,098 | A | * | 1/1911 | McCaskell ............... B01J 19/26 422/224 |
| 1,156,946 | A | * | 10/1915 | Vandercook .............. B01F 5/10 366/137 |
| 1,992,261 | A | * | 2/1935 | Traudt ................... B01D 41/02 68/235 R |

(Continued)

FOREIGN PATENT DOCUMENTS

| | | |
|---|---|---|
| WO | WO-2010/060092 A2 | 5/2010 |
| WO | WO-2020/074949 A1 | 4/2020 |

OTHER PUBLICATIONS

International Search Report for PCT/IB2018/059053, 7 pages (dated Aug. 13, 2019).

(Continued)

*Primary Examiner* — David L Sorkin
(74) *Attorney, Agent, or Firm* — Osha Bergman Watanabe & Burton LLP (57) ABSTRACT

An example system for conditioning drilling fluid includes a tank to hold drilling fluid and outlet conduits located at least partly within the tank. The outlet conduits have a tree structure that includes a trunk and branches. Each of the branches has one or more nozzles for outputting drilling fluid within the tank. The system also includes one or more inlet conduits for receiving drilling fluid from the tank and one or more pumps that are controllable to suction the drilling fluid from the tank through the one or more inlet conduits and to force the drilling fluid into the tank through the outlet conduits.

15 Claims, 3 Drawing Sheets

(56) References Cited

U.S. PATENT DOCUMENTS

| | | | |
|---|---|---|---|
| 2,325,573 A * | 7/1943 | Thompson | C08B 30/16 |
| | | | 127/28 |
| 2,353,230 A | 7/1944 | Garrison et al. | |
| 2,432,175 A | 12/1947 | Schmidt | |
| 2,462,034 A * | 2/1949 | Zeck | A01M 7/0089 |
| | | | 366/136 |
| 2,748,884 A | 6/1956 | Erwin | |
| 3,339,897 A | 9/1967 | Davis, Jr. | |
| 3,632,700 A * | 1/1972 | Oglevee | A61J 3/077 |
| | | | 264/40.4 |
| 3,871,272 A * | 3/1975 | Melandri | C12G 1/0216 |
| | | | 99/276 |
| 4,189,243 A | 2/1980 | Black | |
| 4,215,753 A | 8/1980 | Champness | |
| 4,235,552 A | 11/1980 | Underwood | |
| 4,285,601 A | 8/1981 | Miner | |
| 4,444,277 A | 4/1984 | Lewis | |
| 4,447,157 A | 5/1984 | Underwood | |
| 4,449,849 A | 5/1984 | Horn et al. | |
| 4,474,254 A | 10/1984 | Etter et al. | |
| 4,516,860 A | 5/1985 | van der Laan et al. | |
| 4,544,489 A * | 10/1985 | Campbell | C02F 1/686 |
| | | | 210/709 |
| 5,372,789 A * | 12/1994 | Lamberts | B29B 7/7404 |
| | | | 422/133 |
| 5,609,417 A * | 3/1997 | Otte | B01F 5/0256 |
| | | | 366/137 |
| 5,779,355 A | 7/1998 | Pullman | |
| 6,168,824 B1 * | 1/2001 | Barlow | B05B 12/10 |
| | | | 137/4 |
| 7,296,640 B2 | 11/2007 | Tettleton | |
| 7,582,254 B2 | 9/2009 | Kenning et al. | |
| 7,708,064 B2 | 5/2010 | Sehsah | |
| 7,984,770 B2 | 7/2011 | Sehsah | |
| 8,757,272 B2 | 6/2014 | Couturier et al. | |
| 8,844,633 B2 | 9/2014 | Reitsma et al. | |
| 9,284,799 B2 | 3/2016 | Reitsma et al. | |
| 9,328,574 B2 | 5/2016 | Sehsah | |
| 9,376,875 B2 | 6/2016 | Reitsma et al. | |
| 9,429,007 B2 | 8/2016 | Reitsma et al. | |
| 2003/0206024 A1 * | 11/2003 | Murphy, Jr. | G01N 27/92 |
| | | | 324/713 |
| 2005/0281131 A1 * | 12/2005 | Yungblut | B01F 5/0218 |
| | | | 366/137 |
| 2006/0291326 A1 * | 12/2006 | Crump | B01F 5/0206 |
| | | | 366/137 |
| 2009/0166027 A1 | 7/2009 | Sehsah | |
| 2010/0133007 A1 | 6/2010 | Sehsah | |
| 2011/0232914 A1 | 9/2011 | Reitsma et al. | |
| 2011/0284290 A1 | 11/2011 | Reitsma et al. | |
| 2012/0067591 A1 | 3/2012 | Couturier et al. | |
| 2012/0227961 A1 | 9/2012 | Sehsah | |
| 2012/0228027 A1 | 9/2012 | Sehsah | |
| 2012/0241163 A1 | 9/2012 | Reitsma et al. | |
| 2013/0087332 A1 * | 4/2013 | Miller | C09K 8/487 |
| | | | 166/280.2 |
| 2013/0088934 A1 | 4/2013 | Gouin | |
| 2014/0060835 A1 * | 3/2014 | Morris | C09K 8/40 |
| | | | 166/293 |
| 2015/0003185 A1 * | 1/2015 | Woodle | B01F 5/0206 |
| | | | 366/136 |
| 2015/0083429 A1 | 3/2015 | Reitsma et al. | |
| 2016/0348452 A1 | 12/2016 | Reitsma et al. | |
| 2017/0260820 A1 | 9/2017 | Sehsah | |
| 2017/0268303 A1 | 9/2017 | Zazula et al. | |
| 2018/0072936 A1 | 3/2018 | Sehsah et al. | |
| 2018/0230761 A1 | 8/2018 | Sehsah | |
| 2018/0230767 A1 | 8/2018 | Sehsah et al. | |

OTHER PUBLICATIONS

Written Opinion for PCT/IB2018/059053, 11 pages (dated Aug. 13, 2019).

National Oilwell Varco, Mud Mixer-Hopper, 3 pages (Mar. 8, 2017). URL: https://www.nov.com/.../Rig_Equipment/Offshore/Drilling_Fluid_Equipment/Mud_Mixing_and_Additive_Systems/Mud_Mixer-Hopper.aspx (Retrieved Sep. 10, 2018).

* cited by examiner

CONDITIONING DRILLING FLUID

TECHNICAL FIELD

This specification relates generally to example systems and processes for conditioning drilling fluid.

BACKGROUND

During construction of an oil or gas well, a drill string having a drill bit bores through earth, rock, and other materials to form a wellbore. The drilling process includes, among other things, circulating drilling fluid through the wellbore. This circulation includes pumping the drilling fluid from the surface into the wellbore and receiving the drilling fluid from the wellbore at the surface.

The rheology of the drilling fluid can affect its performance, including its ability to transport earth, rock, and other materials from the wellbore to the surface. Fluid characteristics that are based on the drilling fluid's rheology include viscosity and shear stress. Viscosity is a measure of the fluid's resistance to flow. Shear stress is a based on the fluid's shear rate, which is the fluid's viscosity gradient measured perpendicular to the direction of flow. To achieve a target rheology, drilling fluid may be been conditioned on the surface in a mud tank using an agitator or a mud gun. In some cases, the drilling fluid may be conditioned downhole by circulating the drilling fluid multiple times through nozzles on the drill bit.

SUMMARY

An example system for conditioning drilling fluid includes a tank to hold drilling fluid and outlet conduits located at least partly within the tank. The outlet conduits have a tree structure comprised of a trunk and branches. Each of the branches has one or more nozzles for outputting drilling fluid within the tank. The system also includes one or more inlet conduits for receiving drilling fluid from the tank and one or more pumps that are controllable to suction the drilling fluid from the tank through the one or more inlet conduits and to force the drilling fluid into the tank through the outlet conduits. The system may include one or more of the following features, either alone or in combination.

At least some of the nozzles may have different diameters than others of the nozzles. Each of the branches may include multiple nozzles that are arranged longitudinally. On at least one of the branches, nozzles are arranged at different locations along a circumference of the branch. The one or more inlet conduits may be a single inlet conduit and the one or more pumps may be a single pump. The one or more inlet conduits may include multiple inlet conduits and the one or more pumps may include multiple pumps. The drilling fluid may include oil and water. The one or more pumps may be controllable to force the drilling fluid into the tank to create an emulsion containing the oil and the water.

The example system may include a control system to obtain a rheology of the drilling fluid and to continue operation of the one or more pumps until a target rheology is achieved. The control system may include a viscometer to obtain at least part of the rheology by sampling the drilling fluid passing through the one or more pumps. The example control system may include a computing system to control the one or more pumps based on the rheology obtained by the viscometer. Controlling the one or more pumps may include controlling a rate at which the one or more pumps suctions the drilling fluid from the tank and forces the drilling fluid through outlet conduits. The rheology may include measurements for one or more of a viscosity of the drilling fluid, a yield point of the drilling fluid, a gel strength of the drilling fluid, or an electrical stability of the drilling fluid. The rheology may include measurements for the viscosity of the drilling fluid, the yield point of the drilling fluid, the gel strength of the drilling fluid, and the electrical stability of the drilling fluid.

An example method for conditioning drilling fluid includes suctioning the drilling fluid from a tank, forcing the drilling fluid back into the tank at multiple different depths within the tank and from multiple different directions to shear the drilling fluid, monitoring a rheology of the drilling fluid during the suctioning and forcing, and based on the monitoring, continuing the suctioning and the forcing until the rheology of the drilling fluid reaches a target rheology. The method may include one or more of the following features, either alone or in combination.

The drilling fluid may include oil and water. Forcing the drilling fluid back into the tank creates an emulsion comprised of the oil and the water. The water in the emulsion may be contained in droplets having a resolution on the order of microns. The drilling fluid may be forced back into the tank via outlet conduits having a tree structure comprised of a trunk and branches. Each of the branches may have one or more nozzles for outputting the drilling fluid within the tank. The example method may include replacing a first nozzle among the one or more nozzles with a second nozzle having at least one of a different size or a different shape than the first nozzle.

Monitoring the rheology of the drilling fluid may include rotating a cylinder of a viscometer at multiple different rates of rotation and recording readings at the multiple different rates of rotation.

The example method may include discontinuing suctioning and forcing when the target rheology is reached. The drilling fluid then may be pumped into a wellbore. The suctioning and the forcing may be resumed following a period of time until the target rheology is reached again.

Any two or more of the features described in this specification, including in this summary section, may be combined to form implementations not specifically described in this specification.

All or part of the systems and processes described in this specification may be controlled by executing, on one or more processing devices, instructions that are stored on one or more non-transitory machine-readable storage media. Examples of non-transitory machine-readable storage media include read-only memory, an optical disk drive, memory disk drive, random access memory, and the like. All or part of the systems and processes described in this specification may be controlled using a computing system comprised of one or more processing devices and memory storing instructions that are executable by the one or more processing devices to perform various control operations.

The details of one or more implementations are set forth in the accompanying drawings and the description subsequently. Other features and advantages will be apparent from the description and drawings, and from the claims.

DESCRIPTION OF THE DRAWINGS

Like reference numerals in different figures indicate like elements.

DETAILED DESCRIPTION

Described in this specification are example systems for conditioning drilling fluid. The example systems include a tank to hold drilling fluid. In some examples, the drilling fluid contains oil, water, and various additives. The drilling fluid is conditioned by shearing the oil and water over a period of time to create an emulsion. In some examples, the emulsion holds the water in droplets that are on the order of microns in diameter. An emulsion having water droplets of this size may be more stable than emulsions having larger-sized water components.

The example system is located outside of a wellbore where the drilling fluid is to be used. For example, the system may be located at the wellhead. The example system includes outlet conduits located at least partly within the tank. The outlet conduits may be metal pipes, for example, that are arranged in a tree structure comprised of a trunk and branches. Each of the branches includes one or more nozzles for outputting drilling fluid within the tank. The branches and nozzles are arranged to force the drilling fluid into the tank at multiple different depths of the tank and from multiple different directions in order to shear the drilling fluid. The example system also includes one or more inlet conduits for receiving drilling fluid from the tank. For example, there may be a single inlet conduit for receiving drilling fluid from the tank and for transporting the drilling fluid to a pumping system. In an example, the pumping system includes one or more pumps that are controllable to suction the drilling fluid from the tank through the one or more inlet conduits and to force the drilling fluid back into the tank through the outlet conduits.

The example system also includes a control system for monitoring a rheology of the drilling fluid during operation of the pumping system—for example, during the suctioning and forcing. In an example, a viscometer may be used to monitor one or more of a viscosity of the drilling fluid, a yield point of the drilling fluid, and a gel strength of the drilling fluid. An electrical stability tester may be used to measure the electrical stability of the drilling fluid. The control system may control the pumping system so that operation of the pumps continues until the rheology of the drilling fluid reaches a target rheology. In other words, the operation of the pumps is continued to shear the drilling fluid until the target rheology is reached. The control system may include a computing system that is programmed to control the pumping system to reach, and to maintain, the target rheology.

Figure 1:
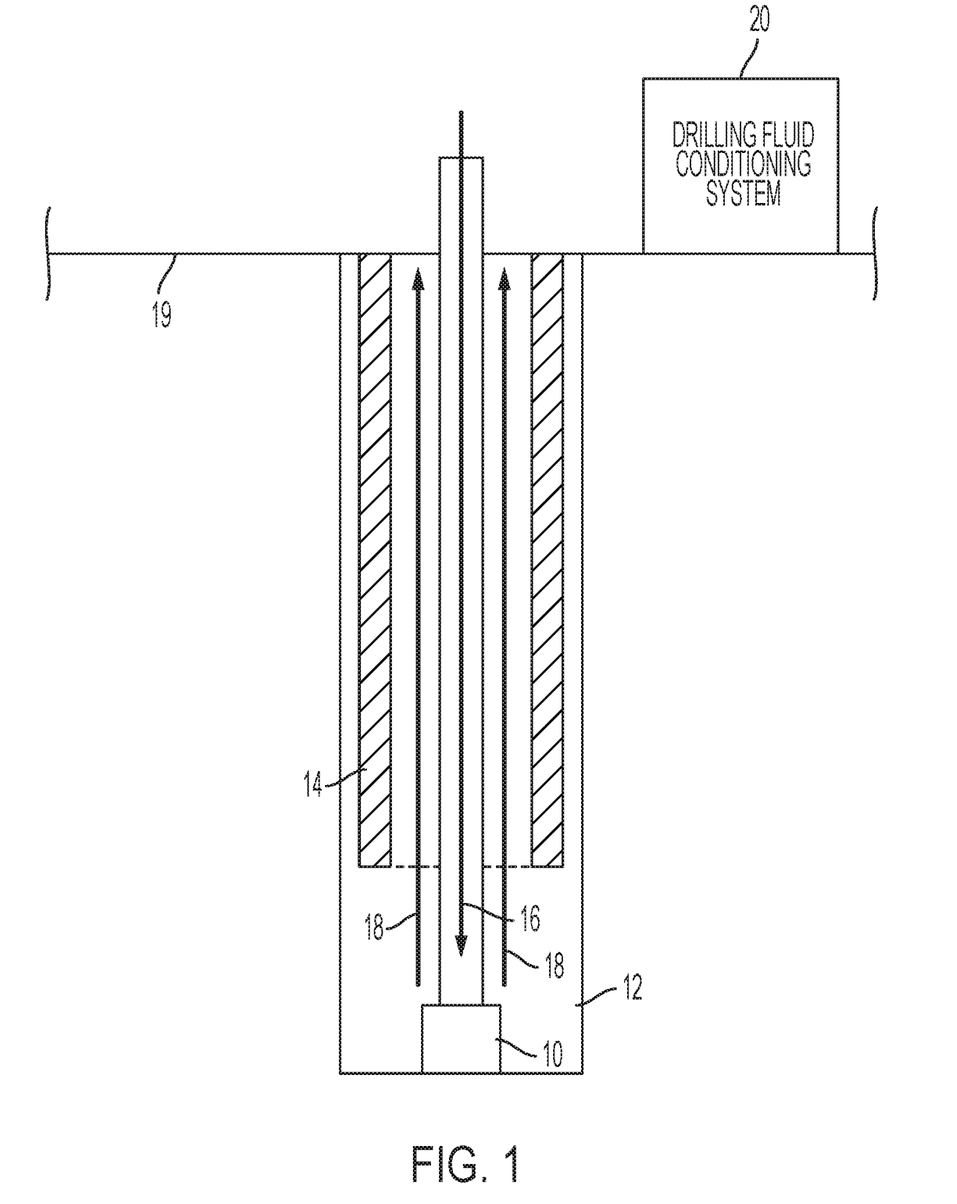
FIG. 1 is cross-sectional, side view of an example wellbore.

Referring to FIG. 1, to produce a well, a drill 10 bores through earth, rock, and other materials to form a wellbore 12. A casing 14 supports the sides of the wellbore. The drilling process includes, among other things, pumping drilling fluid 16 down into the wellbore and receiving return drilling fluid 18 containing materials from the wellbore at surface 19. In some implementations, the drilling fluid includes water- or oil-based mud and the return fluid carries mud, rock, and other materials from the wellbore to the surface. This circulation of drilling fluid into, and out of, the wellbore, may occur throughout the drilling process.

Figure 2:
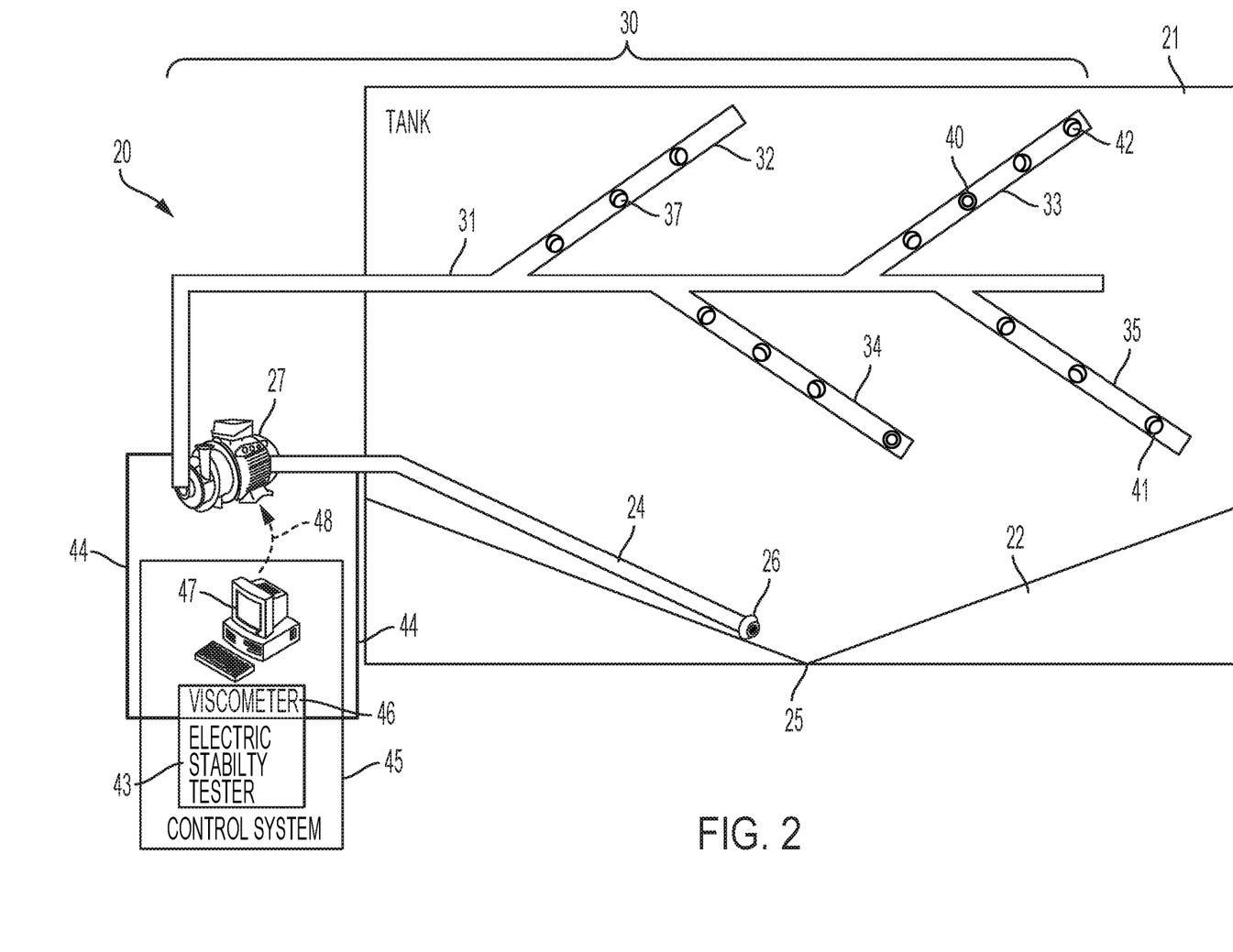
FIG. 2 is a block diagram of an example system for conditioning drilling fluid.

Drilling fluid that does not have the proper rheology for given conditions may be less effective at carrying materials to the surface and at lubricating the wellbore. Accordingly, the drilling fluid is conditioned prior to being pumped downhole. The conditioning process may include mixing the drilling fluid to produce an emulsion. FIG. 2 shows an example system 20 for conditioning the drilling fluid. System 20 may be located outside of the wellbore. For example, system 20 may be located at the surface, such as at the wellhead, as shown in FIG. 1.

System 20 includes a tank 21. In this example, tank 21 includes a mud tank having an angled, or V-shaped, bottom 22 where solids may collect. An example tank holds 296 barrels of drilling fluid and has dimensions of 128 inches in width (W) by 220 inches in length (L) by 102 inches in depth (D) (325.12 centimeters (cm) W by 558.8 cm L by 259 cm D). Another example tank holds 199 barrels of drilling fluid and has dimensions of 128 inches W by 148 inches L by 102 inches D (325.12 centimeters (cm) W by 375.9 cm L by 259 cm D).

An inlet conduit extends into tank 21. The inlet conduit may include one or more pipes that are configured and arranged to transport drilling fluid. The pipes may be metal, plastic, or composite, for example. In the example of FIG. 2, there is a single inlet conduit 24. However, the system may include more than one inlet conduit, for example, two inlet conduits, three inlet conduits, or four inlet conduits. In this example, inlet conduit 24 extends towards or to the nadir 25 of bottom 22 so that its opening 26 can receive the drilling fluid from or near to the nadir 25. By extending the inlet conduit into the nadir, which is the lowest part of the tank, any solids collected there can be suctioned and recirculated throughout the system.

System 20 also includes a pumping system to circulate the drilling fluid into, and out of, the tank. The pumping system includes one or more pumps. In this example, the pumping system includes a single pump 27; however, there may be two, three, four, five, or more pumps included in the system. Pump 27 contains one or more motors to suction drilling fluid from tank 21 via inlet conduit 24 and to output the drilling fluid forcefully through outlet conduits 30. In some implementations, the pump forces the drilling fluid through the outlet conduits at a pressure of between 30 pounds-per-square inch (PSI) (206.843 Kilopascals (kPA)) and 1000 PSI (6894.76 kPA) or more. Pump 27 suctions the drilling fluid from the tank and forces the drilling fluid back into the tank in a repetitive and continuous process until a target rheology is reached for the drilling fluid. Through this operation of the pump, the system is able to circulate the drilling fluid and thereby mix, or shear, the drilling fluid to emulsify the drilling fluid. Pump 27 is controlled to start operation, to continue operation, and to stop operation by a control system 45, which is described subsequently.

In the example of FIG. 2, outlet conduits 30 are located in tank 21 and are configured in a tree structure comprised of a trunk 31 and multiple branches 32, 33, 34, and 35. Although a single trunk is shown, the outlet conduits may contain multiple trunks, such as two, three, four, five, or more trunks. Although four branches are shown for trunk 31, the outlet conduits may include fewer than four branches per trunk, such as one, two, or three branches, or more than four branches per trunk, such as five, six, seven, eight, or more branches per trunk. Each branch and each trunk may include a pipe. Each pipe may be made of metal, plastic, or composite, for example. All pipes in the tree structure may be made of the same material or different pipes within the tree structure may be made of different materials. In the example of FIG. 2, trunk 31 is connected to pump 27 to receive the drilling fluid from tank 21 forced out by the pump.

Each branch of the outlet conduits includes one or more nozzles for outputting drilling fluid within, and into, tank 21. In the example of FIG. 2, each branch has four nozzles. However, each branch may include fewer than four nozzles or less than four nozzles. For example, each branch may include one, two, three, five, six, seven, eight, nine, ten, or more nozzles. The nozzles are arranged longitudinally along each branch in the example of FIG. 2. In some implementations, the nozzles may be arranged longitudinally at different locations along the circumference of each branch. In some implementations, the nozzles may be arranged longitudinally at the same location along the circumference of each branch. Each of the nozzles may have the same size fluid output port, for example, each fluid output port may have the same diameter. Different ones of the nozzles may have different size fluid output ports, for example, different diameters. In some implementations, the fluid output ports may have diameters within a range of 8/32 (0.25) inches (0.635 centimeters (cm)) to 28/32 (0.875) inches (2.22 centimeters)

In some implementations, the nozzles are replaceable. For example, a first nozzle 37 may be replaced with a second nozzle (not shown) having a fluid output port having a larger or smaller diameter than the fluid output port of the first nozzle. Various factors contribute to the shear produced by the nozzles. Generally, for a stream of drilling fluid, nozzles having smaller-diameter fluid output ports expel drilling fluid with greater force than nozzles having a larger-diameter fluid output ports. In the example of FIG. 2, each nozzle is circular in shape. However, the nozzles may have shapes other than circles. For example, the nozzles may have square, rectangular, oval, or triangular shapes. Different shaped nozzles expel the drilling fluid with different force and in different shaped streams.

The nozzles are positioned, and their outputs are directed, to force the drilling fluid back into the tank at multiple different depths within the tank and from multiple different directions in order to shear the drilling fluid and to produce the emulsion of oil and water in the drilling fluid. That is, outputting the fluid in different directions may enhance mixing within the tank and produce the appropriate amount of shearing to create the emulsion. In the example of FIG. 2, the nozzles face in various directions in order to output the drilling fluid in different directions. For example, nozzle 40 faces out of the page, nozzle 41 faces upward and to the left, and nozzle 42 faces downward and to the right.

In some implementations, the output directions of the nozzles are adjustable. For example, nozzles may have fluid output ports that are configurable to output drilling fluid over a range of directions. In some implementations, the fluid output ports may be configured manually. For example, a technician, upon installing or replacing a nozzle, may manually set the direction of the fluid output port of the nozzle. In some implementations, the fluid output ports may be configured automatically, for example, in response to commands transmitted by a computing system. For example, each nozzle may include electronics to receive commands from the computing system and a motor that is controlled by the electronics to change or to adjust the direction of the nozzles fluid output port. In some implementations, the diameter of the fluid output port of each nozzle may be adjustable manually or through commands received from a computing system. Such a computing system may be part of, or separate from, control system 45.

In the example of FIG. 2, control system 45 is configured—for example, programmed, constructed, or arranged—to obtain a rheology of the drilling fluid and to control the pumping system to continue operation until a target rheology is achieved. The control system may include a viscometer 46 to obtain at least part of the rheology of the drilling fluid by sampling the drilling fluid passing through pump 27. The drilling fluid is sampled at the input and the output of the pump through sampling conduits 44. In some implementations, the viscometer includes a rotating cylinder and a stator (or bob) that is connected to a spring. The cylinder is rotated at different rates, such as 600 rotations-per-minute (RPM), 300 RPM, 6 RPM, or 3 RPM. Readings are obtained from the viscometer at these different rates of rotation. These readings constitute rheology measurements. These measurements may include measurements of a plastic viscosity of the drilling fluid, a yield point of the drilling fluid, and a gel strength of the drilling fluid.

An electrical stability tester ("tester") 43 may also be part of the control system to measure oil-wetting capabilities of the drilling fluid and thereby determine the electrical stability (ES) of the drilling fluid. Tests may also be conducted to determine the shearing effectiveness of the drilling fluid.

Accordingly, in some implementations, the rheology may include measurements for one or more of the following properties of the drilling fluid: a plastic viscosity (PV) of the drilling fluid, a yield point (YP) of the drilling fluid, a gel strength (GEL) of the drilling fluid, and an electrical stability (ES) of the drilling fluid.

An example of a desired, or target, rheology for drilling fluid of the type defined by Table 3 (shown subsequently) is shown in Table 1.

TABLE 1

| PROPERTIES (UNITS) | VALUE RANGE |
| --- | --- |
| 600 RPM | 74-108 |
| 300 RPM | 42-70 |
| PV (CENTIPOISE) | 32-38 |
| YP (POUNDS PER SQUARE FOOT (LBS/100 FT$^2$)) | 10-32 |
| 10 SECOND GEL (LBS/100 FT$^2$) | 8-10 |
| 10 MINUTE GEL (LBS/100 FT$^2$) | 12-16 |
| ES (VOLTS) | 600-800+ |
| HIGH-TEMPERATURE, HIGH-PRESSURE (HTHP) FLUID LOSS (200° FAHRENHEIT/500 PSI) | 1.2-1.8 |

The control system may include a computing system 47. Computing system 47 is configured—for example, programmed—to obtain readings relating to the drilling fluid's rheology from the viscometer and tester and to compare those readings against a target rheology for the drilling fluid. There may be a wired or wireless connection between the computing system and the viscometer and tester, over which the computing system may obtain the readings. The wired or wireless connection may include direct connections, such as Ethernet cable or radio frequency (RF) signals or the connection may include a wired or wireless computer network, such as a local area network (LAN), a wide area network (WAN), or a cellular network. Examples of computers and associated hardware that may be used to implement computing system 47 are described in this specification.

Computing system 47 is configured—for example, programmed—to control operation of pump 27 based on the rheology readings from the viscometer and tester. Arrow 48 represents this control conceptually. For example, the computing system may control the rate (or speed) at which the pump operates, the duration of the pump's operation, or both the rate of the pump and its duration of operation. In this example, the rate includes the speed of operation of the pump's motor and thus the speed at which the pump suctions the drilling fluid from the tank through the inlet conduit and forces the drilling fluid through the outlet conduits.

Figure 3:
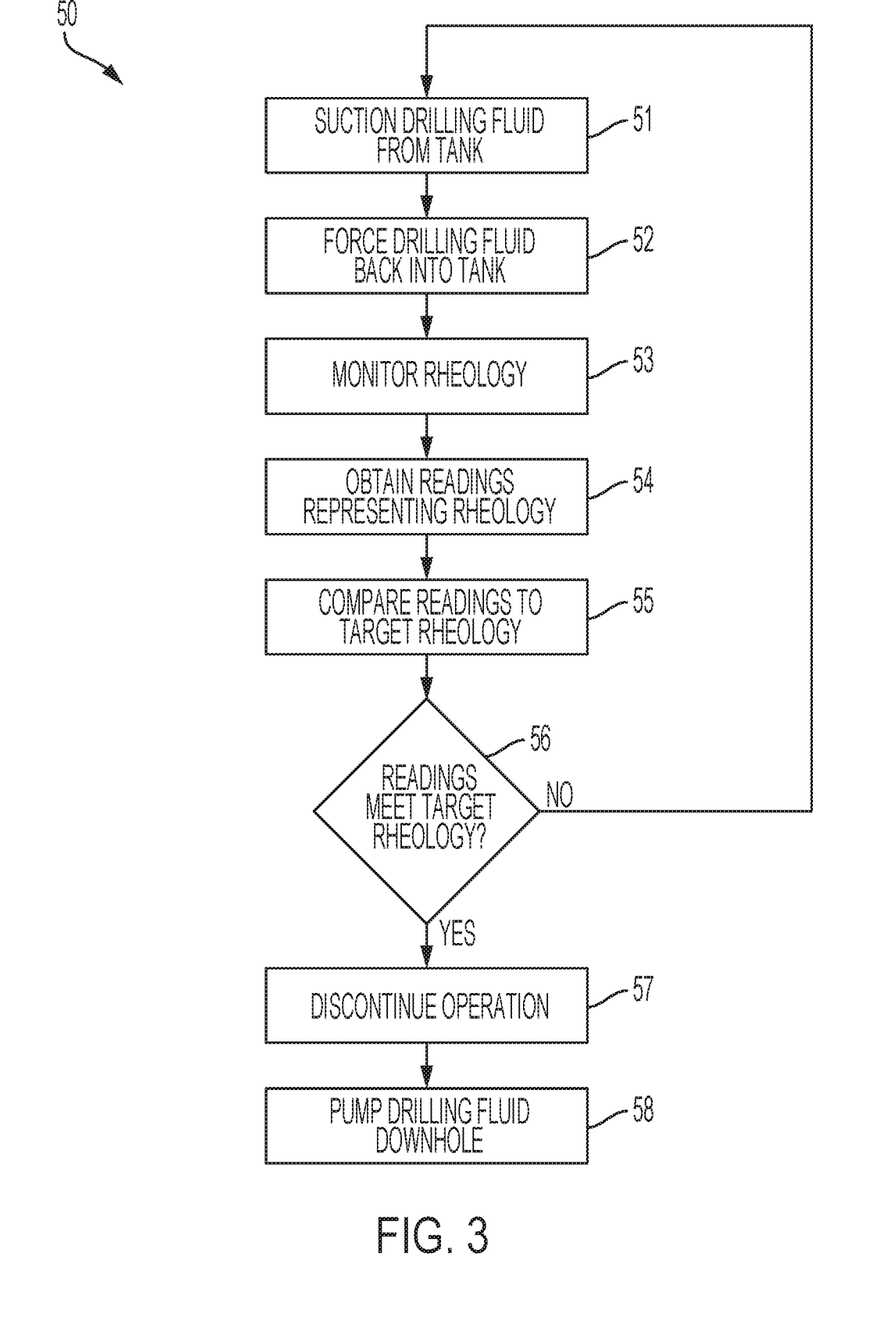
FIG. 3 is a flowchart showing an example process for conditioning drilling fluid.

FIG. 3 shows an example process 50 for conditioning drilling fluid using a system like that shown in FIG. 2. In some implementations, process 50 runs automatically. For example, process 50 may run absent user intervention.

Process 50 includes suctioning (51) drilling fluid from tank 21. Pump 27 is operated to suction (51) the drilling fluid through inlet conduit 24 and to force (52) the drilling fluid back into the tank through the outlet conduits. This circulation of the drilling fluid continues while the rheology of the drilling fluid is monitored (53). The rheology of the drilling fluid may be monitored, for example, by the viscometer and the electrical stability tester. As explained, the viscometer operates by rotating a cylinder at multiple different rates of rotation and recording readings at the multiple different rates of rotation. As also noted, the electrical stability tester measures the oil-wetting capabilities of the drilling fluid.

Readings from the viscometer and tester representing the rheology of the drilling fluid are obtained (54) by the computing system 47 for analysis. The computing system may compare (55) the readings from the viscometer to a target rheology stored in its memory. As shown in Table 1 above, the target rheology may include minimum values or ranges for drilling fluid properties including, for example, a plastic viscosity of the drilling fluid, a yield point of the drilling fluid, a gel strength of the drilling fluid, and an electrical stability of the drilling fluid. If the readings indicate that the drilling fluid does not meet (56) the target rheology, shearing of the drilling fluid continues. That is, pump continues to suction (51) the drilling fluid and to force (52) the drilling fluid back into tank 21 at multiple different depths within the tank and from multiple different directions while the rheology is monitored (53). As explained, the drilling fluid is forced back into the tank via outlet conduits having a tree structure comprised of a trunk and branches, with each of the branches having nozzles for outputting the drilling fluid within the tank.

The drilling fluid circulates into and out of the tank, while continuing to mix to produce an emulsion of water and oil in which the water is contained in droplets having a resolution on the order of microns. The water droplets may have diameters of one micron, two microns, three microns, four microns, or five microns, for example. The control system continues to monitor the rheology of the drilling fluid as the drilling fluid is suctioned from the tank and forced back into the tank. In some implementations, the computing system may change the rate of operation of the pump. For example, the rate of operation of the pump may be increased from an initial level of 650 PSI to 1000 PSI during operation. For example, if the initial pump operation rate does not produce the target rheology, then the pump rate may be increased gradually or in discrete increments until the target rheology is met. When the rheology of the drilling fluid meets (56)—for example, comes with range of, matches, or exceeds—the target rheology, the computing system discontinues (57) operation of the pump and, therefore, ceases mixing of the drilling fluid. The rheology of the sampled drilling fluid may come within an acceptable range of the target rheology if the rheology of the sampled drilling fluid is within 1%, 2%, 3%, 4%, 5%, 10%, 15%, or 20%, for example, of the target rheology. The drilling fluid may then be pumped (58) from the tank into the wellbore.

Table 2 shows the rheology of a drilling fluid measured at 120° F. (48.9° C. (Celsius)). The original rheology is the initial rheology of the drilling fluid. The target rheology is the rheology to which the rheology readings are compared and that the drilling fluid is to reach through operation of system 20.

TABLE 2

| RHEOLOGY AT 120° F. (48.9° CELSIUS (C.)) | ORIGINAL RHEOLOGY | TARGET RHEOLOGY |
| --- | --- | --- |
| 600 RPM | 71 | 78 |
| 300 RPM | 44 | 55 |
| 200 RPM | 34 | 40 |
| 100 RPM | 23 | 28 |
| 6 RPM | 8 | 10 |
| 3 RPM | 7 | 9 |
| PV (CP) | 27 | 28 |
| YP (LBS/100 FT$^2$) | 17 | 27 |
| 10 SEC GEL | 6 | 10 |
| 10 MIN GEL | 8 | 11 |
| ES (VOLTS) | 226 | 310 |

In some cases, the drilling fluid may not be pumped downhole, but rather may remain in the tank. In such cases, the emulsion produced by system 20 may dissipate, causing the rheology of the drilling fluid in the tank to deviate from the target rheology. Accordingly, process 50 may be repeated after a period of time, for example, every one to six hours, in order to ensure that the drilling fluid remains ready for use. In this case, the pump resumes its operation to suction the drilling fluid from the tank and to force the drilling fluid back into the tank until the rheology of the drilling fluid again reaches the target rheology. In some cases, system 20 may be reconfigured during dormant periods. In an example, one or more nozzles may be replaced with one or more different nozzles having a different size, a different shape, or both a different size and a different shape. In an example, the computing system may reconfigure the sizes, shapes, or directions of one or nozzles.

Table 3 shows the composition of example oil-based drilling fluids that may be conditioned using process 50 and system 20.

TABLE 3

| ADDITIVES | UNITS | WEIGHT 85 PCF (POUNDS PER CUBIT FOOT) | WEIGHT 90 PCF |
| --- | --- | --- | --- |
| SAFRA OIL | BARREL | 0.491 | 0.475 |
| INVERMUL | GALLON | 1.5 | 1.5 |
| LIME | POUND | 6 | 6 |
| DURATONE OR CAROTROL | POUND | 6-8 | 6-8 |
| WATER | BARREL | 0.14 | 0.136 |
| GELTONE II OR VG 69 | POUND | 6-10 | 6-10 |
| OMNIPLEX OR RM-63 | POUND | 1 | 1 |
| EZ-MUL | GALLON | 0.5 | 0.5 |
| CALCIUM CHLORIDE (CaCl$_2$) (78%) | POUND | 31.4 | 40.5 |
| MARBLE MEDIUM (CaCO$_3$) | POUND | 30 | 30 |
| BARITE | POUND | 165 | 200 |

Although a vertical wellbore is show in the example presented in this specification, the process described in this specification may be implemented in wellbores that are, in whole or part, non-vertical.

All or part of the system and process described in this specification and their various modifications may be controlled at least in part, by one or more computers using one or more computer programs tangibly embodied in one or more information carriers, such as in one or more non-transitory machine-readable storage media. A computer program can be written in any form of programming language, including compiled or interpreted languages, and it can be deployed in any form, including as a stand-alone program or as a module, part, subroutine, or other unit suitable for use in a computing environment. A computer program can be deployed to be executed on one computer or on multiple computers at one site or distributed across multiple sites and interconnected by a network.

Actions associated with controlling the system and process can be performed by one or more programmable processors executing one or more computer programs to control all or some of the well formation operations described previously. All or part of the system and process can be controlled by special purpose logic circuitry, such as, an FPGA (field programmable gate array), an ASIC (application-specific integrated circuit), or both an FPGA and an ASIC.

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, such as magnetic, magneto-optical disks, or optical disks. Non-transitory machine-readable storage media suitable for embodying computer program instructions and data include all forms of non-volatile storage area, including by way of example, semiconductor storage area devices, such as EPROM (erasable programmable read-only memory), EEPROM (electrically erasable programmable read-only memory), and flash storage area devices; magnetic disks, such as internal hard disks or removable disks; magneto-optical disks; and CD-ROM (compact disc read-only memory) and DVD-ROM (digital versatile disc read-only memory).

Elements of different implementations described may be combined to form other implementations not specifically set forth previously. Elements may be left out of the system and process described without adversely affecting their operation or the operation of the system in general. Furthermore, various separate elements may be combined into one or more individual elements to perform the functions described in this specification.

Other implementations not specifically described in this specification are also within the scope of the following claims.

What is claimed is:

1. A system comprising:
    a drill for boring through earth, rock, and other materials to form a wellbore;
    a casing for supporting sides of the wellbore;
    a tank to hold drilling fluid, the tank fluidly coupled to the wellbore;
    outlet conduits located at least partly within the tank, the outlet conduits having a tree structure comprised of a trunk and branches, each of the branches having one or more nozzles for outputting drilling fluid within the tank;
    one or more inlet conduits for receiving drilling fluid from the tank;
    one or more pumps that are controllable to suction the drilling fluid from the tank through the one or more inlet conduits and to force the drilling fluid into the tank through the outlet conduits; and
    a control system comprising a viscometer and an electrical stability tester to obtain a rheology of the drilling fluid, and a processor to continue operation of the one or more pumps until a target rheology is achieved,
    where the rheology comprises measurements obtained from the viscometer at different rates of rotation; and
    where the rheology comprises measurements for a viscosity of the drilling fluid, a yield point of the drilling fluid, a gel strength of the drilling fluid, and an electrical stability of the drilling fluid,
    wherein the processor is configured to control the one or more pumps such that if initial pump operation rate of the one or more pumps does not produce the target rheology, then pump operation rate of the one or more pumps is increased gradually or in discrete increments until the target rheology is met;
    wherein the processor is configured to control the one or more pumps such that when the rheology of the drilling fluid comes with range of the target rheology, the operation of the one or more pumps is controlled to discontinue.

2. The system of claim 1, where at least some of the nozzles have different diameters than others of the nozzles, and
    where a direction of the fluid output port of the nozzle is defined manually by an operator, or automatically in response to commands transmitted by the processor.

3. The system of claim 1, where each of the branches comprises multiple nozzles that are arranged longitudinally at different locations along the circumference of each branch.

4. The system of claim 1, where, on at least one of the branches, nozzles are arranged at different locations along a circumference of the at least one of the branches, and
    where a first nozzle of the nozzles is configured to be replaced with a second nozzle comprising a fluid output port comprising a larger or smaller diameter than the fluid output port of the first nozzle.

5. The system of claim 1, where the one or more inlet conduits comprises a single inlet conduit and the one or more pumps comprises a single pump,
    where the operation of the pump circulates the drilling fluid thereby mixing, or shearing, the drilling fluid to emulsify the drilling fluid.

6. The system of claim 1, where the one or more inlet conduits comprise multiple inlet conduits and the one or more pumps comprise multiple pumps, and
    where the one or more inlet conduits suctions the drilling fluid from the tank, forcing the drilling fluid back into the tank at multiple different depths within the tank and from multiple different directions to shear the drilling fluid.

7. The system of claim 1, where the viscometer comprises a rotating cylinder and a stator connected to a spring,
    where the cylinder is rotated at different rates,
    where the viscometer obtains at least part of the rheology by sampling the drilling fluid passing through the one or more pumps; and
    the processor is configured to control the one or more pumps based on the rheology obtained by the viscometer by comparing the readings from the viscometer to a target rheology stored in a memory.

8. The system of claim 7, where controlling the one or more pumps comprises controlling a rate at which the one or more pumps suctions the drilling fluid from the tank and forces the drilling fluid through outlet conduits.

9. The system of claim 1, where the drilling fluid comprises oil and water; and
 where the one or more pumps are controllable to create an emulsion containing the oil and the water.

10. The system of claim 1, where the tank comprises a mud tank, and
 where the mud tank has an angled bottom.

11. The system of claim 7, where the electrical stability tester is used to measure oil-wetting capabilities of the drilling fluid.

12. The system of claim 10, where the one or more inlet conduits extends toward a nadir of the angled bottom for receiving the drilling fluid near the nadir.

13. The system of claim 1, where each nozzle of the one or more nozzles includes electronics to receive commands from the processor,
 the system further comprising a motor for adjusting a direction of the one or more nozzles, the motor being controlled by the electronics.

14. The system of claim 1, where the system is located at a wellhead, and
 where the outlet conduits comprise metal pipes.

15. The system of claim 1, wherein the processor is configured to determine that the rheology of the drilling fluid comes with range of the target rheology if the rheology of the drilling fluid is within 1%, 2%, 3%, 4%, 5%, 10%, 15%, or 20% of the target rheology.

* * * * *